United States Patent [19]

Poletto

[11] Patent Number: 4,766,014

[45] Date of Patent: Aug. 23, 1988

[54] PROCESS FOR PRODUCING ARTIFICIAL LEATHER SIMILAR TO REAL LEATHER BY CHEMICALLY PROCESSING SYNTHETIC SHEET MATERIAL

[75] Inventor: Giorgio Poletto, Cirié, Italy

[73] Assignee: Lorica S.p.A., Italy

[21] Appl. No.: 940,286

[22] Filed: Dec. 11, 1986

[51] Int. Cl.$^4$ ............................................. B05D 5/00
[52] U.S. Cl. .................................... 427/245; 427/400; 428/904
[58] Field of Search .................. 8/436, 515, 94.19 R, 8/94.23; 428/904; 521/53; 427/245, 246, , 242, 400

[56] References Cited

FOREIGN PATENT DOCUMENTS 2010332 3/1970 Denmark .
1192598 5/1970 United Kingdom .

Primary Examiner—A. Lionel Clingman
Assistant Examiner—John F. McNally
Attorney, Agent, or Firm—Michael N. Meller

[57] ABSTRACT

Synthetic sheet material comprising a porous polyurethane resin matrix containing polyester or polyethylene fibers, and a pressed polyurethane resin cover film patterned to imitate natural leather is treated inside rotary tanning drums, with a bivalent or trivalent metal salt solution, preferably of a chloride or sulphate, which is brought up to precipitation pH level in such a manner as to fill the pores in the polyurethane matrix on the sheet material with a corresponding hydroxide, after which the material is treated with a dialdehyde; fireproofing, coloring and softening substances.

11 Claims, 1 Drawing Sheet

PROCESS FOR PRODUCING ARTIFICIAL LEATHER SIMILAR TO REAL LEATHER BY CHEMICALLY PROCESSING SYNTHETIC SHEET MATERIAL

BACKGROUND OF THE INVENTION

The present invention relates to a process for producing artificial leather, which looks and feels exactly the same as real tanned leather, using as raw material one of the many synthetic sheet materials known and marketed under various trade names and commonly referred to as "imitation leather". In particular, the present invention relates to a chemical process particularly suitable for synthetic sheet material comprising a porous polyurethane resin matrix, the latter embedded with polyester or polyethylene strengthening fibres, and a compact, pressed polyurethane resin cover film patterned to imitate real leather.

Various synthetic sheet materials are known, made from polymer resins and designed to imitate and replace various types of real leather for a wide range of applications, e.g. for upholstery, shoes, clothing and similar. The said synthetic sheet materials are usually made using two layers of polyurethane resin placed one on top of the other, the bottom one of which is foamed so as to produce a porous matrix (open- or closed-cell, depending on the type of manufacturing process employed) designed to afford consistency and thickness to the said sheet material, whereas the top layer is compact, usually coated on and pressed with a pattern imitating real leather. Of known materials, the best, and the one most closely resembling real leather in terms of consistency and appearance, is a material of the aforementioned type, i.e. formed of polyurethane resin layers and comprising a porous, open-cell matrix embedded and polyester or polyethylene fibres allowed to move essentially freely along their axes inside the said matrix. A section of such a material is shown in the microphoto in FIG. 1, the said material being made and marketed by the Japanese firm "KURARAY CO. Ltd", 1-12-39 Umeda, Kita-ku, OSHAKA 530 (Japan).

A major drawback of known materials of the aforementioned type is that they are highly inflammable and therefore require the addition of fireproofing substances. In addition to being impaired drastically in appearance, to such an extent as to be rendered unusable for a wide range of applications, the look, feel and consistency of the said materials is highly unsatisfactory and still far from competing with the appearance and consistency of real leather.

SUMMARY OF THE INVENTION

The aim of the present invention is to provide a chemical process for treating the aforementioned type of synthetic sheet materials in such a manner as to render the appearance and consistency of the same identical to those of real leather, and also for enabling fireproofing of the same.

A process for producing artificial leather similar to natural leather by chemically processing porous, synthetic sheet material of known type comprising a porous polyurethane matrix and a pressed polyurethane resin cover film patterned to imitate real leather, said process comprising the steps of:

treating said synthetic sheet material with an aqueous solution of the type normally employed in known tanning processes, until said sheet material is saturated by the tanning solution, said step being carried out under the known tanning conditions; and subjecting said treated sheet material to a greasing process substantially identical to the known greasing process to which natural leather is subjected.

DETAILED DESCRIPTION OF THE INVENTION

Figure 1:
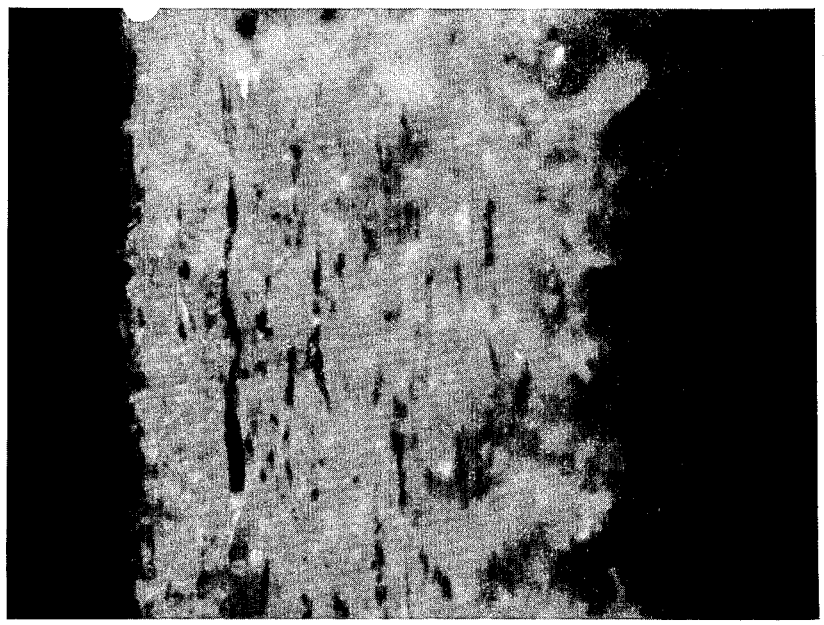

In short, the present Applicant has discovered that, by subjecting porous, shyntetic sheet material, imitating real leather, to a process closely resembling tanning, i.e. the process used for preventing real leather from rotting, the appearance and consistency of the said synthetic material were transformed to such an extent as to closely resemble real lether after tranning. The surprising part about this discovery is that tanning is known to have essentially no effect on the appearance and consistency of real leather, the purpose of the process being simply to attack and chemically transform the fibres of which the leather is formed, in such a manner as to prevent the latter from rotting, but without altering the structure on which the well-known properties of real leather depend. The synthetic sheet materials known as "imitation leather", on the other hand, consist of synthetic fibres which, in addition to being non-perishable in themselves, present polymer chains having essentially saturated links and which are therefore unaffected by commonly-used tanning chemicals. Clearly, therefore, applying the said processes to the said synthetic sheet materials would be considered, not only pointless, but indeed absurd by an average tanner or organic chemist. Experiments conducted by the present Applicant, however, have shown that, by treating porous synthetic sheet material (i.e. having micropores visible only under an electronic microscope) firstly using "pseudo-tanning" salt solutions, i.e. of the type normally employed in known tanning processes or having similar chemical-physical properties, operating substantially under the known tanning conditions, and then subjecting the material so processed to a subsequent greasing process, just substantially identical to the known greasing process to which real leather is subjected and consisting in treating the material with oil emulsions, the said materials absorb and retain internally, in essentially stable manner, at least part of the tanning salt contained in the said salt solutions, in such a manner as to be changed drastically in appearance and consistency after processing; to be more precise, in such a manner as to acquire added consistency and the appearance and feel typical of real tanned leather. It has also been shown that, following such processing, the said materials are less inflammable and may be subjected to any known type of specific dying process for the polymers of which the said sheet material so processed is formed, thus enabling, if conducted correctly, the production of a finished product extremely similar to real leather and of good appearance. The present Applicant has also surprisingly discovered that the flexibility of the said materials may be improved to such an extent as to be essentially equal to or only slightly inferior to that of real leather by treating the said materials, not only with the said psuedo-tanning salt solution and the said greasing oil, but also with a solution of water and at least one di- or polyaldehyde. Finally, the present Applicant has also surprisingly discovered that, for obtaining the best results, the pseudo-tanning salt solution process must be conducted differently from the real leather tanning process, that is, by appropriately adjusting, when the sheet material is satured by the tanning solution, the pH level of the tanning solution itself by adding to it a strong base, such as NaOH (sodium hydroxide) in place of the weak bases, such as sodium bicarbonate, usually employed in chromium tanning processes; the processing salts used are preferably trivalent metal sulphates and/or chlorides and/or bi-trivalent metal sulphates (i.e. sulphates metals, such as iron, which are capable of assuming various grades of oxidation).

According to the present invention, the porous, shyntetic sheet material, usually in strips of about 10 m in length, is collected and tied firmly into bales of such a size as to enable it to be loaded inside a rotary drum, e.g. of the type normally employed for tanning real leather. The bales of synthetic sheet material so formed are than placed inside the said drums which are than started up and the material chemically processed by feeding the various chemical solutions into the drum as it is turned. In more detail, according to the present invention, the porous synthetic sheet material is first subjected to a "soaking" process essentially consisting in treating the material for ten minutes to an hour at 50°-60° C. in a solution of water and surface-active substances. Upon completion of the said "soaking" stage, which provides for soaking the material thoroughly and filling practically all the pores in the same with liquid, the rotary drum is filled with the first processing solution consisting in the said bi- and/or trivalent metal salt solution. The synthetic sheet material is treated in the said salt solution for about ten minutes to an hour, until the said solution permeates essentially the entire section of the material, after which, it is treated with a pseudo-tanning caustic soda solution for bringing the pH level up to about 7. At this point, the solution is brought up to a temperature of about 60° C. and the pH level raised further, though never over 7.5 so that part of the salt contained in the solution are precipitated as hydroxides, which precipitate in the solution essentially in the form of a gel. As prolonged treatment of the sheet material in the said pseudo-tanning salt solution causes part of the pores on the said material to be fully saturated, during the precipitation stage, part of the hydroxides precipitate in gel form straight into the said pores which are thus filled with gel to produce a fairly noticeable increase in the weight and consistency of the sheet material so processed. Furthermore, as hydroxides are known to be fairly good fireproofing substances, the synthetic sheet material so processed is considerably less inflammable than in its original form. Upon completion of the precipitation stage, the sheet material is washed to remove any surface traces of hydroxide, after which, the material is treated for ten minutes to an hour, still inside the said rotary drum, with a solution of water and 5-10% by weight of a di- or polyaldehyde. Dialdehyde processing of the material has been found to afford flexibility, as well as maintaining the superior properties acquired by the material in normal use. Finally, the material so processed is put through a number of further processes, the most important of which—greasing—has been found to be essential for obtaining the required results, i.e. for transforming the original synthetic material into one identical to real leather. The said greasing process, conducted inside rotary drums, is identical to the real leather greasing process, except that use may be made indifferently of mineral oils or, preferably, higher fatty acid ester emulsion, preferably sulfated sperm oil at a temperature of about 60° C. for a few minutes to an hour. When treating composite material, i.e. having synthetic fibres embedded in the porous synthetic matrix, the said greasing process is particularly effective in that the esters and oils, which would not normally be retained by compact synthetic resins, are retained by the synthetic fibres and pores in the processed material in such a manner as to give the latter the characteristic appearance of real leather. Furthermore, the said oils and esters also improve fibre flow inside the porous matrix in such a manner as to give the processed material the characteristic consistency and feel of real leather. Further processes the material may be subjected to according to the process covered by the present invention include dying, which is conducted in known manner, i.e. after washing the material in cold water; and fireproofing which, according to the present invention, is performed by treating the material, in a rotary drum for a few minutes to and hour, in a fireproofing solution containing, in place of the normal fireproofing substances employed (with little success) in known fireproofing processes, any known retarding substances of the type employed for extinguishing forest fires, the said substances being marketed under various trade names and being based on ammonium salts. Though the said retarding substances are absorbed by the said sheet material in such a manner as to render the latter essentially inlammable, the resulting material is made to stiff as to be totally unusable. Such stiffening, however, is overcome according to the present invention by combining the fireproofing/retarding solution treatment with a finish process whereby the sheet material is treated, again in a rotary drum, in a solution containing any known ordinary commercial softening substances, e.g. with solutions of chemical compounds having a linear hydrocarbon chain of about 12 up to 18 carbon atoms coupled with a radical selected from the group consisting of $-SO_3X$, wherein X is any alkali metal, even different from Na (e.g. K or Li) and $-(OCH_2CH_2)yOH$, wherein y is an integer from 1 to 18. In more detail, according to the present invention, the said synthetic sheet material is treated in fireproofing solution of PIROFLAM (registered trade mark) and then in a softening solution of TRIANOL SP (registered trade mark) to which is added, according to the present invention, a small percentage of PIROFLAM to prevent the ammonium and retarding salts absorbed by the material in the previous fireproofing process from being dissolved. Finally, the material is dried in hot air, after which, the bales are undone and the sheet material rolled up and sent off for finishing in exactly the same way as for real leather. As the said finishing process is conducted in known manner and does not come within the scope of the present invention, no mention will be made of it herein. The present Applicant has discovered that the process according to the present invention enables the production of really good-quality artificial leather, practically identical to real leather, only when applied to a particular group of synthetic sheet materials or "imitation leather" comprising a porous polyurethane resin matrix, the latter embedded with polyester, polyamide or polyethylene fibres, and a compact, pressed polyurethane resin cover film. In this case, according to the present invention, the dying stage, after greasing the material with sulfated esters is performed by treating the sheet material inside a rotary drum for at least two hour in a mixture of complex metal colouring substances specially devised for polyester or polyurethane polymer fibres, the said process being conducted in such a manner that the colouring substances adhere successively to the said sheet material. The process is conducted for about at least an hour at approximately 40° C., after which, the temperature is raised to about 60° C. for the remainder of the dying stage. The material is then dried by means of forced hot-air ventilation at about 70° C. inside the drum, preferably turning at a speed of 4–6 rpm. The sheet material employed is preferably 0.3 to 2 mm thick, depending on what it is to be used for, and, after processing according to the present invention, looks essentially as shown in the microphoto in FIG. 2.

Figure 2:
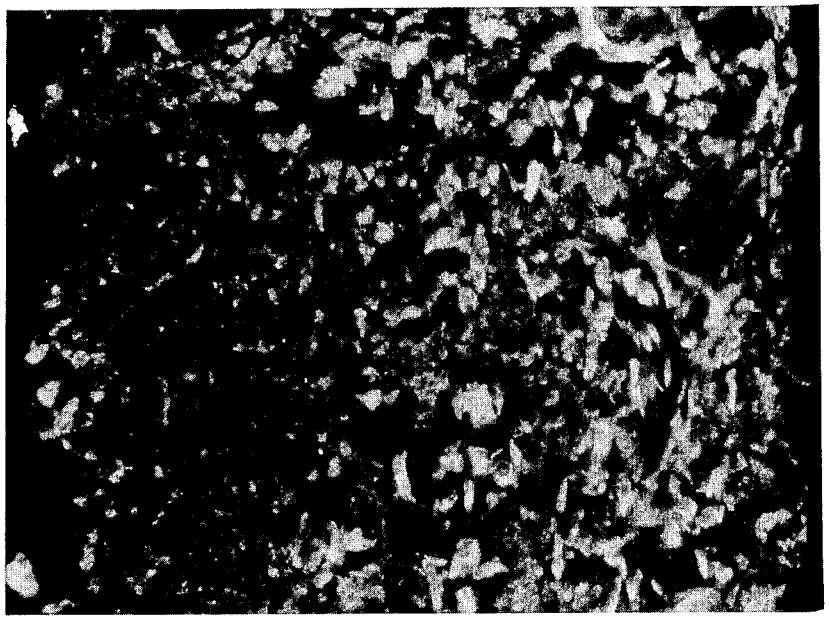

The two microphotos in FIGS. 1 and 2 clearly show the difference in structure and appearance, even at microscope level, between the said material before (FIG. 1) and after (FIG. 2) processing according to the present invention. The latter therefore clearly provides for transforming relatively poor-quality "imitation leather" into very good-quality artificial leather with which to manufacture upholstery, shoes, clothing and similar of essentially the same appearance and quality as those made using real leather.

The present invention will now be described by way of a number of non-limiting examples.

EXAMPLE I

Twelve 10 m long strips of porous, synthetic sheet material, as shown in the microphoto in FIG. 1, were folded and tied up into twelve 250×120×120 cm bales and loaded inside a rotary drum of about 5.6 cu.m. in volume. The material employed was composed of a layer of porous polyurethane resin covered with a layer of compact polyurethane resin pressed to imitate calf leather; the porous polyurethane layer containing a high number of polyester fibres oriented in various directions and housed in sliding manner inside the polyurethane matrix. The material was 1.2 mm thick and is produced and marketed by KURARAY CO. Ltd, 1-12-39, Umeda, Kita-ku, OSHAKA 530 (Japan). After loading the said material inside the drum, the latter was filled with 650 liters of water containing surface-active substances and the solution brought up to 60° C. After running the drum at a speed of 15 rpm for 20 minutes, the water and surface-active substance solution was drained off and the drum filled with 650 liters of a "tanning" solution containing 30% by weight of ferric sulphate, which was brought up to a pH level of 3.2 and a temperature of 60° C. After running the drum for about 40 minutes, the pH level was raised to 7.1, by adding NaOH 10N, and the temperature to 60° C., in such a manner as to precipitate Fe(OH)3 with abundant flocculation. Finally, after rinsing thoroughly in water and draining off the used-up solution, the drum, still turning, was filled with 650 liters of a water solution containing a weight of aspartic aldehyde equal to 6% of the total weight of the treated material. After running the drum for 42 minutes, the said solution was drained off and the sheet material treated with the drum still turning, for 45 minutes at 65° C. in 650 liters of a 25% by weight solution of sulfated spermaceti vax oil (sperm oil). Following such processing the sheet material was dyed, still inside the turning drum, by treating it with a solution of water and 3% of BASACRIL (registered trade mark) for 55 minutes at 40° C., then for an hour at 60° C., after which, it was rinsed thoroughly. Finally, the material was treated, still inside the turning drum, with 252.5 liters of a solution of water and 60% by weight of PIROFLAM (registered trade mark) for 30 minutes, then with 56.25 liters of a solution of water and 30% by weight of PIROFLAM and 20% by weight of TRIANOL SP (registered trade mark) for 15 minutes. The material was then dried with hot air at 60° C. inside the drum turning at a speed of 6 rpm.

EXAMPLE II

Twelve 10 m strips of shyntetic material as in Example I were treated in exactly the same way as in Example I, but using a 650 liters of solution containing 39% by weight of chromium sulphate in place of the solution of ferric sulphate. The resulting material presented an excellent consistency and feel and a satisfactory outward appearance as in Example I.

EXAMPLE III

The material used in Examples I and II was treated in the same way as in Example I, but using a 650 liters of a 30% by weight solution of ferrous sulphate instead of ferric sulphate. The resulting material after processing was identical to that of Example I.

EXAMPLE IV

The material used in Example I was treated in exactly the same way as in Example I, but using a 10% by weight solution of glutaric aldehyde instead of the solution of aspartic aldehyde. The resulting material presented a high degree of flexibility as well as a fairly good appearance.

EXAMPLE V

After processing, the sheet material used in Example I was formed into twenty 20×20 cm test pieces and comparison-tested, together with corresponding test pieces of tanned calf leather of the same size, as to tensile, abrasion and bending resistance. The results are shown in Table I.

TABLE 1

|  | Real calf leather | Polyurethane-matrix resin + polyester fibres after processing |
|---|---|---|
| Tensile resistance | G | E |
| Abrasion resistance | G | G |
| Bending resistance | G | G |

(E = Excellent; G = Good; P = Poor)

EXAMPLE VI

The sheet material used in Example I was formed, before and after processing, into 20×20 cm test pieces which were then combustion-tested as per Standard Federation standards No. 302 (horizontal test piece). Four test pieces of processed material dyed different colours were comparison-tested with four pieces of unprocessed raw material. The results expressed in terms of combustion rate (mm/min) are shown in Table II.

TABLE II

| Test piece | Unprocessed material | Processed material |
|---|---|---|
| Yellow | 181.5 mm/min | zero |
| Brown | 181 mm/min | zero |
| Black | 180 mm/min | zero |
| Khaki | 182 mm/min | zero |

EXAMPLE VII

The process described in Example I was applied to a starting sheet material consisting of a 0.8 mm thick, two-ply sheet of polyurethane foam covered with a compact polyurethane film, of the type normally used for upholstering vehicle sunshields. The resulting product, tested as described in Examples V and VI, gave the same results as those shown in Tables I and II, though the feel was of inferior quality, as compared with the finished product in Example I.

EXAMPLE VIII

Twelve 10 m strips of synthetic sheet material of different thickness and composition were treated operating in rotary drums just as described in Example I, employing the same volumes of treating solutions and operating substantially with the same parameters, except varying the final pH value of the tanning solution before discharge, some other parameters as indicated herein below, and the chemicals nature of some of the treating water solutions or simply their concentration in the active component. The different treated materials, indicated with progressive alphabet letters, are shown in Table III, while in Table IV are shown, for each material treated, the processing condition varied with respect to those gived in Example I. The lines of Table IV are identified by codes given by a progressive number followed by the aplhabetically identification of the treated material.

The greasing emulsion employed were: (a) sperm oil; i.e. solfated spermaceti vax oil; (b) oil B, i.e. a mixture of Oleic Acid (50%) and Palmitic Acid (50%) added with 30% of polyethilene glycole (all % are by weight); (d) Cr-Soap, i.e. a mixture of Stearic acid esters saponified with Crhomium salts; (e) oil D, i.e. a mixture of fatty acid, esters having from 12 up to 24 carbon atom chains, of glycerine; (f) Mineral oil. In the last column of Table IV is indicated the type of dying process used; with letter A is intended the same as described in Example I; with letter B is intended a dying process carried out operating with the known Azoic colour TELON (registered trade mark) at the concentration of 2,2 % in water, heating the solution in 1 hour from 30° C. to 40° C.; with letter C is intended a dying process carried out operating with ISOLAN (registered trade mark) at a concentration of 2,2% in water, heating the solution in 1 hour from 30° C. to 40° C.; finally with letter D is intended a dying process carried out operating with the known emicyamine based colour SUPRAMIL at a concentration of 1,7 % in water, heating the solution in 1 hour from 30° C. to 100° C.

TABLE III

| ID Code | Description of the material | Thickness (mm) |
|---|---|---|
| A | same of Example 1 | 2 |
| B | " | 1,6 |
| C | " | 0,3 |
| D | Polyurethane matrix + polyamide fibers | 0,9 |
| E | " | 2 |
| F | " | 0,3 |
| G | Polyurethane matrix + polyethilene fibers | 1,2 |
| H | " | 2 |
| I | " | 0,3 |

TABLE IV

| ID code | TANNING SOLUTION | | | DIALDEHIYDE SOLUTION | | | GREASING EMULSION | | | dying |
|---|---|---|---|---|---|---|---|---|---|---|
| | Metal Salt us. | % by weight | final pH | Aldehiyde us. | % by weight | Temp. | Fatty sub. | Temp. | % by weight | |
| 1A | Ca sulphate | 45 | 7,5 | glutaric al. | 7 | 40° C. | Sperm oil | 65° C. | 25 | A |
| 2A | Ca sulphate | 42 | 7,4 | glutaric al. | 5 | " | Oil B | 70° C. | 30 | A |
| 3A | Ca sulphate | 15 | 7,4 | piruvic al. | 10 | " | Sperm oil | 65° C. | 25 | B |
| 4B | Al sulphate | 20 | 7,1 | crotonic al. | 5 | " | Castor oil | 70° C. | 28 | C |
| 5B | Mg sulphate | 25 | 7,2 | 2-ethil-butyrric | 10 | " | Mineral oil | 80° C. | 30 | D |
| 6B | Ti sulphate | 22 | 7,3 | 2-ethil-butyrric | 8 | " | Cr-Soap | 60° C. | 30 | A |
| 7C | Al chloride | 38 | 7,1 | crotonic al. | 7 | " | Cr-Soap | 60° C. | 19 | A |
| 8C | Ti chloride | 35 | 7,1 | crotonic al. | 6 | " | Oil D | 60° C. | 30 | A |
| 9C | Mg chloride | 40 | 7,4 | piruvic al. | 8,5 | " | Oil D | 60° C. | 30 | B |
| 10C | Cr chloride | 18 | 7,3 | aspartic al. | 9 | " | Sperm oil | 65° C. | 25 | C |
| 11C | Fe chloride | 30 | 7,5 | glutaric al. | 6 | " | Castor Oil | 70° C. | 28 | D |
| 12D | Ca sulphate | 30 | 7,2 | aspartic al. | 5 | " | Oil B | 70° C. | 30 | D |
| 13E | Cr sulphate | 30 | 7,1 | glutaric al. | 6 | " | Oil B | 70° C. | 30 | B |
| 14F | Ti sulphate | 30 | 7,3 | crotonic al. | 9 | " | Oil D | 60° C. | 30 | B |
| 15G | Mg chloride | 38 | 7,5 | piruvic al. | 10 | " | Oil D | 60° C. | 30 | C |
| 16H | Cr chloride | 35 | 7,5 | 2-ethil-butyrric | 10 | " | Oil D | 60° C. | 30 | C |
| 17I | Al chloride | 30 | 7,5 | 2-ethil-butyrric | 8 | " | Castor oil | 70° C. | 28 | A |
| 18I | Cr sulphate | 30 | 7,4 | glutaric al. | 10 | " | Sperm Oil | 65° C. | 25 | A |

EXAMPLE IX

From the strip processed with the different modalities given in Example VIII were taken sample as in Example V and they were tested as in Examples V and VI. The results are given in Table V.

TABLE V

| ID code | Combustion speed | Tensile Resistance | Abrasion Resistance | Bending Resistance |
|---|---|---|---|---|
| 1A | Zero | E | G | G |
| 2A | " | E | G | G |
| 3A | " | E | G | G |
| 4B | " | G | G | G |
| 5B | " | E | G | G |
| 6B | " | E | G | G |
| 7C | " | E | G | G |
| 8C | " | E | G | G |
| 9C | " | E | G | G |
| 10C | " | E | G | G |
| 11C | " | E | G | G |
| 12D | " | E | G | G |
| 13E | " | E | G | G |
| 14F | " | E | G | G |
| 15G | " | E | G | G |
| 16H | " | E | G | G |
| 17I | " | E | G | G |
| 18I | " | G | G | G |
| Real Calf Leather | — | G | G | G |

(E = Excellent; G = Good; P = Poor)

EXAMPLE X

Operating just as described in EXAMPLE I, twelve 10 m strips of the sheet material of EXAMPLE 1 were treated using different fireproofing and softening solutions, of different chemical nature and composition in place of TRIANOLE SP and PIROFLAM; finally three 20×20 mm samples of the processed material were taken off from each processed strips for each pair of fireproofing-softening solutions employed; the samples were marked with a code consisting in two progressive numbers separated by an hyphen '-', the first number indicating the pair of treating solutions employed and the second number indicating the progressive number of the samples treated with the same solutions. The solutions employed and their composition are contained in TABLE VI, wherein each pair of treating solutions is indicated with the same number used as the first number for the code of the samples of material treated with such solutions. In Table VII are the results of the combustion tests conducted on the samples treated with the solutions of Table VI operating just as in EXAMPLE VI.

TABLE VI

| No. | Type of Fireproofing Agents | | Type of Softening Agents | Fireproofing Solution % by weight | | Softening solution % by weight | | |
|---|---|---|---|---|---|---|---|---|
| | | | | Fireproofing Ag. | Water | Soft. Ag. | Fireproofing Ag. | Water |
| 1 | $(NH_4PO_3)_6$ guanidine | 310 gr. 200 gr. | $C_{12}H_{25}OSO_3Na$ | 40 | q.b. | 10 | 8 | q.b. |
| 2 | $(NH_4PO_3)_6$ guanidine pentaerythritol | 310 gr. 200 gr. 90 gr. | $C_{18}H_{37}OSO_3Na$ | 50 | q.b. | 15 | 15 | q.b. |
| 3 | $(NH_4)_5P_3O_{10}$ guanidine pentaerythritol | 300 gr. 200 gr. 90 gr. | $C_{16}H_{33}(OCH_2CH_2)_8OH$ | 35 | q.b. | 10 | 10 | q.b. |
| 4 | $(NH_4)_5P_3O_{10}$ pentaerythritol $(NH_4PO_3)_6$ | 310 gr. 90 gr. 200 gr. | $C_{12}(OCH_2CH_2)_6OH$ | 55 | q.b. | 18 | 17 | q.b. |
| 5 | $(NH_4)_5P_3O_{10}$ guanidine | 310 gr. 200 gr. | $C_{16}H_{33}OSO_3Na$ | 48 | q.b. | 15 | 15 | q.b. |
| 6 | $(NH_4)_5P_3O_{10}$ guanidine pentaerythritol chlor. rubber | 310 gr. 200 gr. 90 gr. 3,5 gr. | $C_{18}H_{37}OSO_3Na$ | 60 | q.b. | 20 | 18 | q.b. |
| 7 | $(NH_4)_5P_3O_{10}$ guanidine pentaerythritol | 310 gr. 200 gr. 90 gr. | $C_{18}H_{37}(OCH_2CH_2)_{12}OH$ | 30 | q.b. | 10 | 10 | q.b. |
| 8 | $(NH_4)_5P_3O_{10}$ guanidine pentaerythritol | 310 gr. 200 gr. 90 gr. | $C_{12}H_{37}(OCH_2CH_2)_8OH$ | 60 | q.b. | 20 | 20 | q.b. |
| 9 | $(NH_4PO_3)_6$ guanidine pentaerythritol chlor. rubber | 310 gr. 200 gr. 90 gr. 3,5 gr. | $C_{18}H_{37}(OCH_2CH_2)_8OH$ | 60 | q.b. | 20 | 20 | q.b. |
| 10 | $(NH_4PO_3)_6$ guanidine pentaerythritol chlor. rubber | 310 gr. 200 gr. 90 gr. 3,5 gr. | $C_{12}H_{25}(OCH_2CH_2)_8OH$ | 60 | q.b. | 20 | 20 | q.b. |

TABLE VII

| Test piece | Combustion Speed (mm/min.) |
|---|---|
| 1-1 | zero |
| 1-2 | " |
| 1-3 | " |
| 2-1 | " |
| 2-2 | " |
| 2-3 | " |
| 3-1 | " |
| 3-2 | " |
| 3-3 | " |
| 4-1 | " |
| 4-2 | " |
| 4-3 | " |
| 5-1 | " |
| 5-2 | " |
| 5-3 | " |
| 6-1 | " |
| 6-2 | " |
| 6-3 | " |
| 7-1 | " |
| 7-2 | " |
| 7-3 | " |
| 8-1 | " |
| 8-2 | " |
| 8-3 | " |
| 9-1 | " |
| 9-2 | " |
| 9-3 | " |
| 10-1 | " |
| 10-2 | " |
| 10-3 | " |

What is claimed is:

1. A process for producing artificial leather similar to natural leather by chemically processing porous, synthetic sheet material of known type comprising a porous polyurethane matrix and a pressed polyurethane resin cover film patterned to imitate real leather, said process comprising the steps of:

treating said synthetic sheet material with an aqueous solution containing at least one metal salt selected from the group consisting of the sulfates of calcium, chromium, iron, aluminum, magnesium and titanium and the chlorides of chromium, iron, aluminum, magnesium and titanium until said sheet material is saturated by said solution; and in combination:

further treating said sheet material, after the treating with said water solution of metal salts, with a water emulsion of fatty material selected from the group consisting of mineral oil, sulfated sperm oil and esters of substituted or unsubstituted fatty acids having from 12 to 24 carbon atoms.

2. The process according to claim 1, wherein said known synthetic sheet material comprises a porous, polyurethane matrix in which fibers selected from the group consisting of polyester, polyamide and polyethylene fibers are embedded, said sheet material having a thickness of about 0.3 to 2 mm, and said material being collected and tied into bales and treated inside a rotary drum of the type employed for tanning natural leather.

3. The process according to claim 1, wherein said aqueous solution contains said metal salts in a total quantity of from 15% to 45% by weight of the total weight of the solution.

4. The process according to claim 1, wherein said sheet material is further treated with an aqueous solution of 5–10% by weight of the weight of treated sheet material of an aldehyde selected from the group consisting of glutaric aldehyde, pyruvic aldehyde, crotonic aldehyde and 2-ethyl-butyraldehyde; said further treatment with said aldehyde solution being carried out after said treatment with said water solution of said metal salt and before said treatment with said water emulsion of said fatty material.

5. The process according to claim 1, wherein after that said sheet material is saturated with said aqueous solution containing said metal salt, the pH of the solution is raised to a maximum of 7.5 by adding a strong base until the corresponding hydroxide of said metal salt is precipitated directly inside the pores of said sheet material.

6. The process according to claim 1, wherein said synthetic sheet material is first placed inside a rotary tanning-type drum, after which it is treated with water containing surface active substances, after which it is treated with a trivalent metal sulphate salt solution, at first maintaining the pH value of said solution around 3.2 and then charging said trivalent metal sulphate salt solution with NaOH in such a quantity so as to raise the pH value of the solution to about 7–7.5 and so precipitate the corresponding hydroxide, after which said material is washed and treated in a 5–10% by weight solution of a dialdehyde in water.

7. A process according to claim 6, wherein after said dialdehyde treatment, said synthetic sheet material is greased in an emulsion of from 20% up to 40% by weight of a fatty material selected from the group consisting of mineral oil, sulfated sperm oil and fatty acid esters having from 17 to 22 carbon atoms, dyed with a known metal complex coloring agent for polyurethane, washed, treated in a water solution of from 24% to 60% by weight of a fireproofing/retarding substance selected from the group consisting of ammonium phosphates, pentaerythritol, guanidine or a mixture thereof in such a manner as to permeate the entire section of said sheet material and then treated with a softening solution consisting of a solution of water and 8% to 20% by weight of a substance having a linear hydrocarbon chain of about 12 up to 18 carbon atoms coupled with a radical selected from the group consisting of $-SO_3X$, wherein X is an alkali metal, and $-(OCH_2CH_2)_yOH$, wherein y is an integer between 1 and 18; in said softening solution being added an appropriate amount of the same said fireproofing/retarding substance.

8. The process according to claim 7, wherein said softening solution contains from 8% to 20% by weight of said fireproofing/retarding substance.

9. The process according to claim 7, wherein the matrix of said synthetic sheet material consists of a porous polyurethane foam, and the sheet material is dyed in a rotary drum using a water solution from 1% to 3% by weight of a mixture of at least one known complex metal coloring agent specifically for polyester fibers, and at least one known complex metal coloring agent specifically for polyurethane resins, said coloring solution being initially maintained at a temperature of about 40° C. and then raised to about 60° C. after about at least one hour's treatment.

10. The process according to claim 1, wherein said synthetic sheet material is finally dried in hot air and rolled up.

11. Artificial leather produced by the process according to claim 1.

* * * * *